US007826424B2

United States Patent
Yaqub (10) Patent No.: US 7,826,424 B2
(45) Date of Patent: Nov. 2, 2010

(54) PACKET LOSS PREVENTION DURING HANDOFF THROUGH MANAGED BUFFER NODES ARCHITECTURE

(75) Inventor: Raziq Yaqub, Stewartsville, NJ (US)

(73) Assignees: Toshiba America Research, Inc., Piscataway; Telcordia Technologies, Inc., Piscataway (*) Notice: Subject to any disclaimer, the term of this patent is extended or adjusted under 35 U.S.C. 154(b) by 1079 days.

(21) Appl. No.: 11/456,807

(22) Filed: Jul. 11, 2006

(65) Prior Publication Data

US 2007/0081555 A1    Apr. 12, 2007

Related U.S. Application Data

(60) Provisional application No. 60/596,660, filed on Oct. 11, 2005, provisional application No. 60/596,659, filed on Oct. 11, 2005.

(51) Int. Cl.
*H04Q 7/20* (2006.01)
(52) U.S. Cl. .................. 370/331; 370/412; 370/468; 455/436
(58) Field of Classification Search .................. 370/331, 370/412, 468; 455/436
See application file for complete search history.

(56) References Cited

U.S. PATENT DOCUMENTS

| 6,839,329 B1 * | 1/2005 | Sato et al. ............... 370/310.1 |
| 2002/0161919 A1 | 10/2002 | Boucher et al. | |
| 2004/0003126 A1 | 1/2004 | Boucher et al. | |
| 2005/0005024 A1 | 1/2005 | Samuels et al. | |
| 2005/0122986 A1 | 6/2005 | Starr et al. | |
| 2005/0216770 A1 | 9/2005 | Rowett et al. | |
| 2006/0062191 A1 * | 3/2006 | Matsumoto ............... 370/338 |
| 2007/0014259 A1 * | 1/2007 | Fajardo et al. ............. 370/331 |

FOREIGN PATENT DOCUMENTS

WO    2005/070106 A2    8/2005

OTHER PUBLICATIONS

International Search Report dated Feb. 6, 2008 (5 pages).
International Preliminary Report, Apr. 16, 2009, pp. 1-7.
G. Krishnamurthi, "Buffer Management for Smooth HandOvers in Moblie Ipv6", Internet Draft, Jul. 2000, p. 1-27, USA.
"Fast Handovers for Mobile IVPv6", Internet Draft, Oct. 2004, p. 1-53, Mishop Working Group, USA.
M. Khalil, "Buffer Management for Mobile IP", Internet Draft, Oct. 1999, p. 1-20, Internet Engineering Task Force, USA.
N. Moore, "Tunnel Buffering for Mobile Ipv6", Internet Draft, Jul. 2004, p. 1-11, Mobility Optimiziations Group, USA.
Extended European Search Report, issued Nov. 4, 2009 for corresponding European Patent Application No. 06816913.5.

* cited by examiner

*Primary Examiner*—Danh C Le
(74) *Attorney, Agent, or Firm*—Watchstone P&D, PLLC (57) ABSTRACT

In preferred embodiments, a wireless network system features buffering of data packets transmitted to mobile nodes. The system is transparent to the mobile node, so that the mobile node is not required to request service from the network, or negotiate service parameters with the network. An EAPOL-Start and binding update messages initiate and terminate the buffering, and also commence pre-authentication and smooth handoff reporting, respectively.

24 Claims, 5 Drawing Sheets

1. Finds new AP (i.e., AP1 of Subnet B) by receiving a beacon
2. 802.1X frames (carrying EAP) are exchanged between MN and AP1 (subnet-B) through AP1 (Subnet-A) and the copy of same is sent to CBN
3. MN intends to move from AP-1 (Subnet A) to AP-1 (Subnet B)
4. When MN moves to AP-1 (Subnet B), it associates with it by performing protected association by using cipher keys established in Step-2
5. Binding Update Managed Buffer Nodes Architecture 1. Finds new AP (i.e., AP1 of Subnet B) by receiving a beacon
2. 802.1X frames (carrying EAP) are exchanged between MN and AP1 (subnet-B) through AP1 (Subnet-A) and the copy of same is sent to CBN
3. MN intends to move from AP-1 (Subnet A) to AP-1 (Subnet B)
4. When MN moves to AP-1 (Subnet B), it associates with it by performing protected association by using cipher keys established in Step-2
5. Binding Update Figure 1 : Managed Buffer Nodes Architecture Figure 2 (a) : Controller Buffer Node Tasks

| A<br>Current Address of MN<br>(Retrieved from EAPOL-Start) | B<br>Source Address of AP<br>(Retrieved from EAPOL-Start) | C<br>Destination Address of AP<br>(Retrieved from EAPOL-Start) | D<br>New CoA of MN<br>(Retrieved from Binding Update) | E<br>TBN's Address | F<br>FBN's Address |
|---|---|---|---|---|---|
| a1 | b1 | c1 | d1 | e1 | f1 |
| a2 | b2 | c2 | d2 | e2 | f2 |
| a3 | b3 | c3 | d3 | e3 | f3 |
| ….. | ….. | ….. | ….. | | ….. |
| an | bn | cn | dn | en | fn |
| | | | | | |

BNC Saves these Addresses in its table (e.g., for (Mobile Node)1 as a1, b1, c1, d1, e1, and f1 entries, and for (Mobile Node)n as an, bn, cn, dn, en, and fn entries in respective Columns A, B, C, D, E and F Figure 2 (b) : Table Constructed by BNC as per Tasks of Figure 1 (a)

Figure 3 (a) : Transit Buffer Node's Tasks

Figure 3 (b) : Processors' Functions

Figure 4 : Forwarding Buffering Node (FBN)'s Tasks

PACKET LOSS PREVENTION DURING HANDOFF THROUGH MANAGED BUFFER NODES ARCHITECTURE

The present application claims priority to U.S. Provisional Application Ser. No. 60/596,660, entitled Packet Loss Prevention During Handoff Through Managed Buffer Nodes Architecture filed on Oct. 11, 2005, the entire disclosure of which is incorporated herein by reference. The present application also relates to: [1] U.S. Provisional Application Ser. No. 60/596,659, filed on Oct. 11, 2005; [2] U.S. patent application Ser. No. 11/308,175, filed on Mar. 9, 2006 entitled Framework of Media Independent Pre-Authentication; [3] U.S. patent application Ser. No. 09/872,213, filed on Jun. 1, 2001, the entire disclosures of each of which applications [1] to [3] are incorporated herein by reference. The entire disclosures of the following IETF documents are also incorporated herein by reference in their entireties (see: www.ietf.org): [1] draft-krishnamurthi-mobileip-buffer6-00.txt; [2] draft-ietf-mipshop-fast-mipv6-03.txt; [3]. draft-mkhalil-mobileip-buffer-00.txt; [4] draft-moore-mobopts-tunnel-buffering-00.txt.

BACKGROUND

1. Field of the Invention

The present invention relates generally to wireless networking, and, in some preferred embodiments to the prevention of lost packets due to network layer and link layer transition.

2. General Background Discussion

A mobile network seeks to provide security, smooth handoff, minimal data loss and minimal delay. Many of the existing networks involve communication between a Mobile Node (MN) and a Buffering Node (BN). Buffering Service in these cases is inefficient as it requires the MN to explicitly solicit the service. As a result, the amount of wireless signaling traffic is great, and the MN's energy usage is also great, reducing the amount of energy available for sending and receiving messages until a consensus is reached.

Some of the drawbacks of the existing networks are detailed below.

One drawback pertains to an extension to the IUv6 Router, which calls for a router to advertise its ability to support buffering, and which requires the MN to beg the Buffering Node for its desired buffer size, requiring a high volume of messages. This high volume of messages pertaining to BN discovery, as well as probes and responses concerning the service and service negotiation not only consumes scarce network resources, but also adds additional latency to the network.

Another drawback pertains to buffer size. Once a MN receives an advertised indication that Buffering Services are available, the MN may request a specific buffer size. Depending on available resources, the BN may or may not accept this request. Likely, the BN is constrained by a buffer protocol, in which case, if the MN request exceeds the upper limit, the BN may offer a smaller buffer size. Further, if the BN is critically low in available resources, it will send messages back and forth to the MN in an attempt to find an agreeable buffer size, attempting to arrive at a compromise position. In spite of this negotiation, the end result of the requests may be a denial of service. This process leads one to conclude that the BN is in control, and that the MN has no option to protect the packets of data it is trying to send to the BN. As the MN has no other alternative in the event the BN denies service, the MN does not establish communications with the BN or waste its time and energy.

Another drawback occurs when the router cannot accept new requests for buffering, due to resource shortages, but still continues to advertise its capability of buffering and then replying negatively to initialization requests. The router does not have the ability to stop advertising when it is unable to provide buffering because this will adversely affect the handoff operation. This situation creates an unnecessary burden on the network and is illogical as well—advertising services while being unable to provide them.

Another drawback is concerned with the network awareness of the movement of the MN with regard to buffering control protocols in Network Controlled Mobile Assisted (NCMA) handoff mode. In this situation, the previous router supplies the new router with current state information for the MN before the handoff actually occurs and also directs the buffered packets to the new router without the MN's intervention. The MN is thus not required to negotiate with the network and explicitly request initialization of the buffering state and subsequent buffered packet forwarding. However, in many cases, the MN still has to negotiate because the protocols require the MN to do so. Therefore, even in a NCMA case, the MN will always have to issue a Smooth Handoff Initialization (SHIN) to the new router, because it has received a router advertisement for service.

Yet another drawback is directed towards the Buffering Control Protocols requiring the MN to send an anticipated buffer size and time duration for buffer usage. Since Internet Protocol (IP) traffic is of a bursty nature; that is, a continuous transfer of data without interruption from one device to another, any MN estimation may not be accurate, which results in either over-or underestimating the pre-buffering size. Even if an accurate estimation is made by the MN, the buffer size demanded by the MN may not be immediately available, but may become available only moments later, when the BN has completed servicing other MN(s). This instantaneous decision (to accept, deny, or compromise) is based solely on the conditions present at that instant, without regard to conditions in the near future.

Still another drawback is the occurrence of a "time-limited timeout" condition that affects the efficient performance of both the MN as well as the BN since the BN automatically stops buffering without receiving any message (i.e., BReq[stop]) from the MN. In fact, the BReq[stop] message serves a double purpose. First, it stops the buffering event; and second, it informs the BN of the new CoA (Care of Address). In the event of a time-limited timeout, the BN stops buffering without receiving a BReq[stop] message and without receiving the flushing destination (CoA). In order to overcome this situation, the MN must send a separate message "BReq[ext]" to inform the BN, the new CoA, and request an extension of buffering time. If this situation occurs repeatedly, the BN will have received multiple CoAs (though it will use the last CoA for flushing the data packets). This entire situation is undesirable due to the required increased signaling burden and wasted memory required to hold the redundant information of several CoAs. Also, since there is a requirement on the MN to send BReq[ext] messages before the end of the time-limited timeout period, the MN battery life is adversely affected.

In view of the foregoing, an improved buffering service is needed in the wireless network art, which includes a complete architecture harnessed to provide a comprehensive buffering service that offers packet loss prevention to packets in transit during handoffs. More particularly, the improved buffering service of the present invention provides a well-managed buffering architecture harnessed to provide maximum buffer size that best meets the needs of MNs without solicitations or negotiations; reserves buffer size based on multiple factors, including MN's current application, network speed in which MN is roaming, and near future demand and resource predictions; is completely autonomous so that the BNs perform their tasks by communicating amongst other peer BNs and network entities without involving assistance from the MN; can be implemented without introducing new protocols that would enable MNs to communicate with the network for this specific service.

SUMMARY OF THE PREFERRED EMBODIMENTS

The preferred embodiments of the present invention can significantly improve upon the prior art and provide a solution to the problem of an improved buffering service is needed in the wireless network art, which includes a complete architecture harnessed to provide a comprehensive buffering service that offers packet loss prevention to packets in transit during handoffs.

According to one aspect of the present invention, a managed buffer nodes architecture is provided, including the following functional entities: a Controlling Buffer Node (CBN); a Transition Buffer Node (TBN); and a Flushing Buffer Node (FBN). The controlling buffer node performs managerial functions; the transition buffer node holds data packets in transit; and the flushing buffer node facilitates the delivery of data packets. Further, in this embodiment of the present invention, these nodes communicate with each other internally (i.e., no direct communication with external elements e.g., MN), and are less prone to security incursions. The access point (AP) plays a controlling role with a special ability to communicate with APs.

According to one aspect of the present invention, a CBN is provided that is a controlling authority and performs multiple functions: the CBN will be capable of receiving a copy of a EAPOL-Start (Extensible Authorization Protocol Over Lan) message from the AP where the MN is currently located, and extract information; be capable of retrieving, from its own database, the IP address of the TBN and direct the TBN to start buffering; be capable of receiving a copy of a binding update from MN through the previous router, to extract a new CoA of MN in a new network; and be capable of collecting information from TBNs and FBNs for management purposes.

According to one embodiment of the present invention, the TBN will be capable of performing multiple functions, including: receiving a message from the CBN indicating that the MN will handoff; allocating appropriate Buffer Lease Time (BLT), further determined by the user's application, currently available resources, and data rate; extending BLT if required; running compression algorithms to efficiently allocate memory capacity; receiving a second message from the CBN that the MN has completed handoff; draining the buffer packets in the event the service is not delivered successfully; storing the received packets according to the applications; assisting CBN in performing management functions; informing the assisting CBN in performing management functions.

According to one embodiment of the present invention, the Flushing Buffer Node (FBN) will be capable of performing multiple functions, including: acting as a tunnel termination point—receiving packets from the TBN; decapsulating the packets and dispatching them to the AP immediately for further transmission to the MN; receiving packets from peer buffering nodes.

According to another embodiment of the present invention, the CBN, after receiving the destination address of the AP, issues a "release buffer" trigger to the TBN to initiate tunneling packets to the specific FBN. IP addresses to the CBN, TBN, and FBN can be either statically or dynamically assigned, as well as private and not visible outside the network for additional security.

According to another embodiment of the present invention, an ARIMA (autoregressive integrated moving average) model is used to predict the buffering resource demand and then apply the model to predict future buffering resource demand, whereby each CBN is able to accurately, precisely and efficiently predict and reserve a sufficient amount of buffering resources.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

Figure 1:
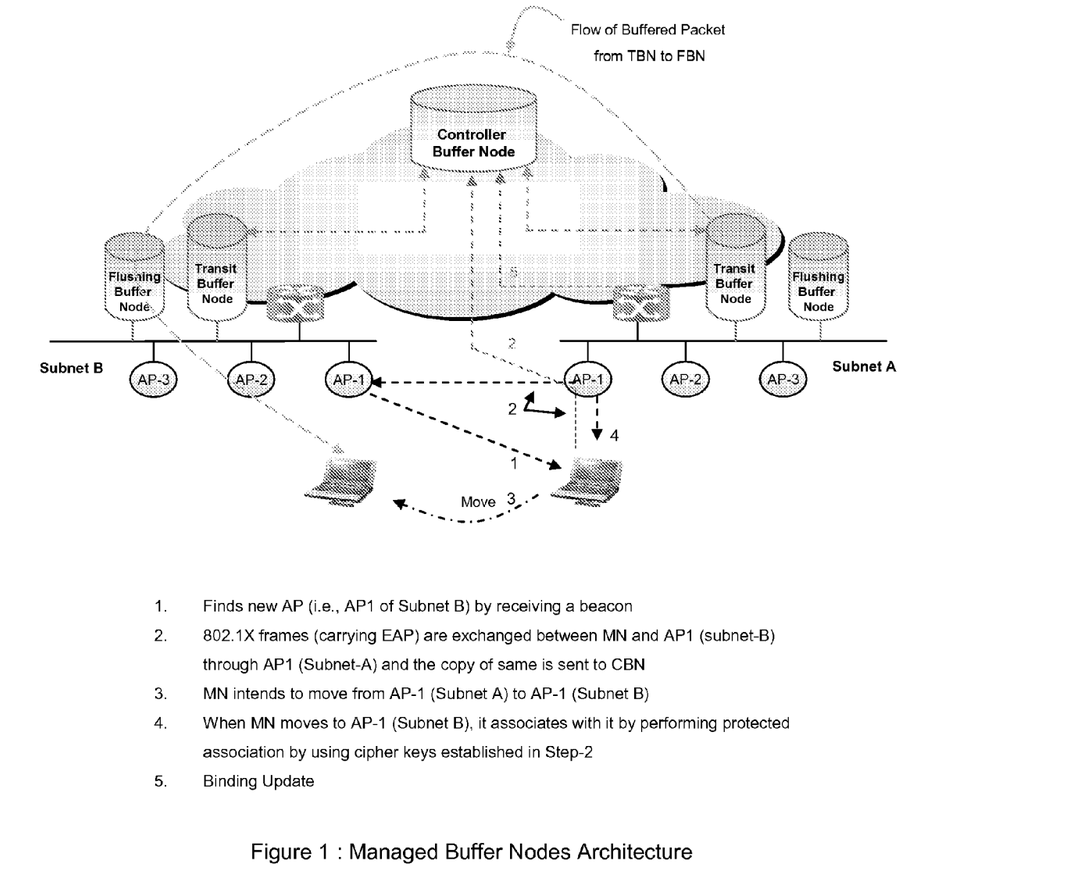
FIG. 1 is a diagram of a managed buffer nodes architecture, in accordance with an embodiment of the present invention.

FIG. 1 illustrates an overview of a managed buffer nodes architecture according to an embodiment of the present invention. The architecture consists of the following functional entities: Controlling Buffer Node (CBN); Transit Buffer Node (TBN); and Flushing Buffer Node (FBN). Each entity, or node, as a specific task. For example, the CBN performs managerial functions, the TBN retains packets in transit; and the FBN facilitates the delivery of packets. For improved security, these nodes communicate with each other internally. This approach diminishes the risk from external security attacks, as no external elements are in communication with the nodes. The Access Point (AP), which has a controlling function, also has the special capability of communicating with other APs. The specific tasks of each node is detailed below.

Figure 2:
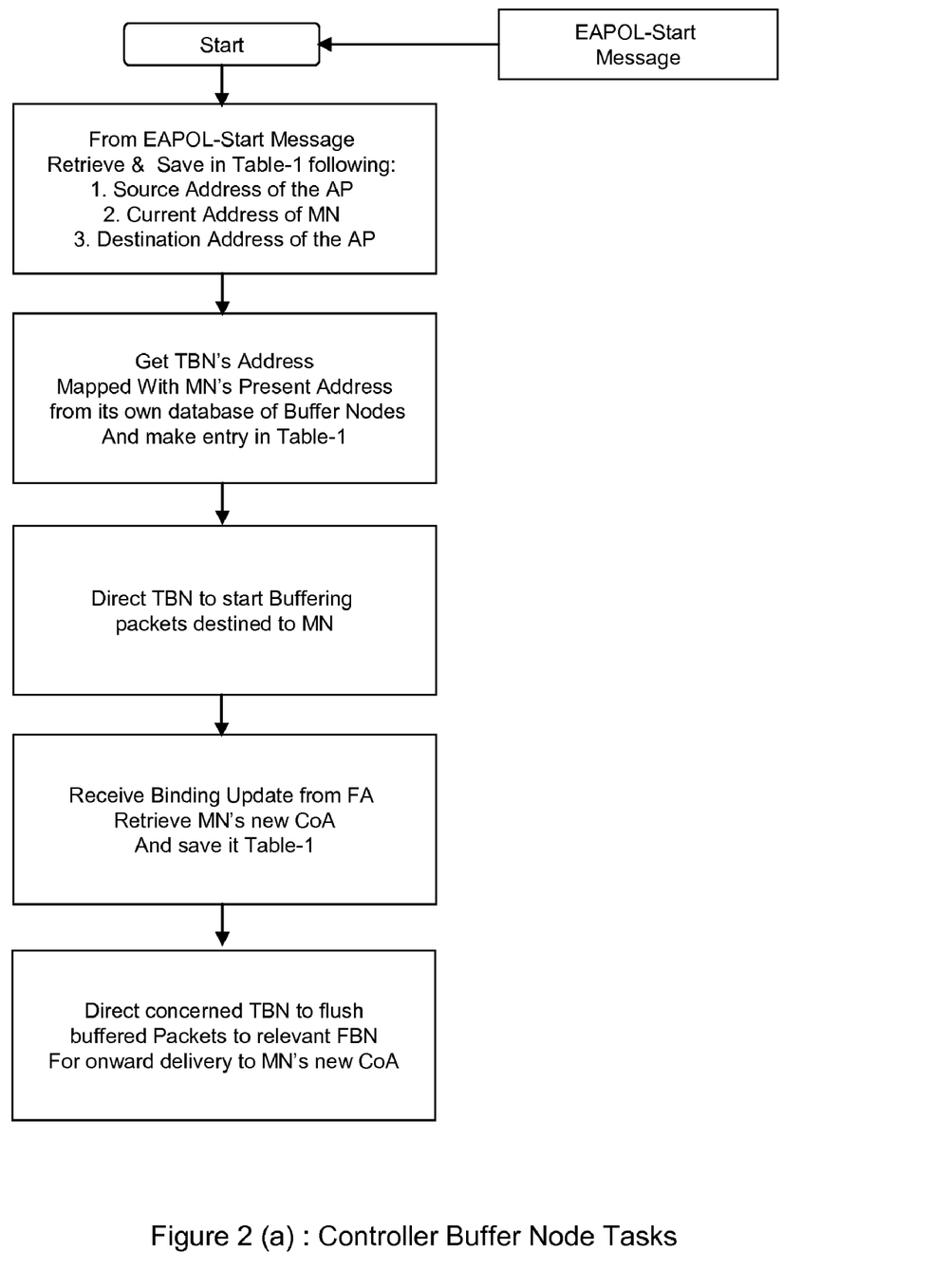
FIG. 2(a) is a diagram of controller buffer node tasks, in accordance with an embodiment of the present invention.
FIG. 2(b) is a table constructed by BNC as per tasks of FIG. 1(a), in accordance with an embodiment of the present invention.

The Controlling Buffer Node (CBN) primary task is as the control authority. As shown in FIG. 2, the CBN receives a copy of the EAPOL-Start message from the Access Point (AP) reporting on the Mobile Node (MN) location (i.e. before moving to a new network). After receiving this message, the CBN extracts the following information, which is saved in its own directory: source address of the AP (from which the EAPOL-Start message is received); current address of the MN (assigned to the network where the MN is presently located); destination address of the AP (for which the MN has requested pre-authentication and intends to move to).

The CBN receives and processes various information, including the IP address of the TBN serving the network where the MN is presently located. The CBN will then instruct this TBN (associated with the MN) to initiate buffering. The instruction will be issued to the TBN at the receipt of the EAPOL-Start message from the MAC Layer Management Entity (MLME) of the access point in which the MN is located.

Further, the CBN receives a copy of the binding update from the MN through a previous router (or foreign agent in case of IPv4). After receiving the binding update message, the CBN extracts a new address (also called a new CoA) of the MN in a new network, after the MN has moved to the new network.

The CBN also retrieves the IP address of the correct FBN from its own database of FBNs duly mapped with address received in the binding update, which binds, or registers, the MN's CoA with the MN's home address.

In yet another function, the CBN collects information from TBNs and FBNs for management functions. The CBN management is dictated by the policy desired; therefore, the user may direct the CBN to collect information in about a variety of information, including available capacity, used capacity, and predicted demand, from the TBN and FBN recurrently. The CBN will then use this information to insure an efficiently managed network as well as for load balancing to achieve optimum buffering.

Figure 3:
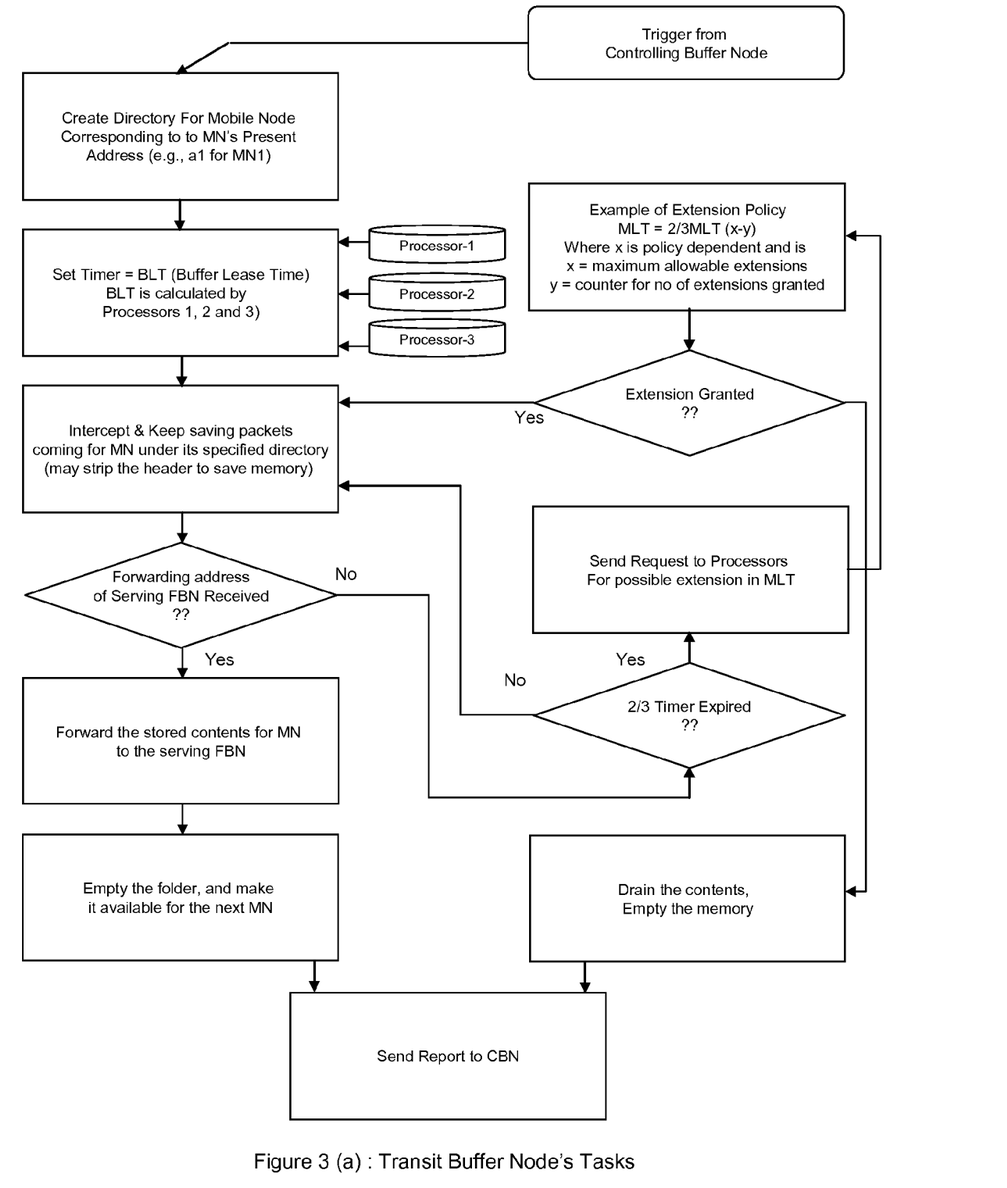
FIG. 3(a) is a diagram of transit buffer node tasks, in accordance with an embodiment of the present invention.
FIG. 3(b) is a chart of processor functions, in accordance with an embodiment of the present invention.

The TBN performs a variety of functions, which are detailed below. As shown in FIG. 3, one of the TBN's functions is receiving a message from the CBN indicating to the TBN that the MN is about to perform a handoff. In some instances, this message can be interpreted to be a "start buffer" trigger. Along with the previous information, the CBN also includes information about the MN's present address, which was extracted from the EAPOL-Start message received from the access point). Next, the TBN begins intercepting and starts saving all types of traffic packets bound for the MN. Additionally, the TBN does not explicitly negotiate buffering parameters or capabilities with the MN—as such, the TBN performs transparently and efficiently.

The TBN allocates appropriate Buffer Lease Time (BLT), which is the time the TBN can offer buffering service. BLT is determined by the TBN based on several factors: user application type (real time or non real time); currently available resources/near future demand resources (determined by demand prediction based on statistical modeling); and data rate provided by the network.

The TBN extends the BLT itself, if necessary. A BLT extension will be calculated by the TBN based on the above factors (user application type, currently available resources/near future demand resources, and data rate). The number of allowable extensions and allocated time for each extension may be governed by a policy, for example, instituted by a service provider. An example is shown in FIG. 3(a), where the extension policy is defined as BLT=2/3BLT (x−y), where x is policy dependent and x=maximum allowable extensions and y=counter for number of extensions granted.

The TBN also runs algorithms to use the memory capability efficiently by using several available compression algorithms, or protocols. For example, the TBN creates a directory with a name corresponding to the MN's present address, saving its packets while stripping off the uniform information (e.g., source and destination address) from each packet, and reattaches the updated address header at the time of release.

By running algorithms/protocols as detailed above, the TBN reserves a sufficient amount of memory for each application.

The TBN can receive a second message from the CBN that indicates that a handoff has occurred. The second message can also be interpreted as a "release buffer" trigger event. As a part of the second message to the TBN, the CBN will also include the MN's new CoA as well as the serving FBN address. The CBN obtained the MN's new CoA from the binding update sent by the previous network router, and the FBN's address from its own database mapped with the MN's new CoA. This FBN, responsible for flushing packets, is located in the network where the MN recently entered. When this message is received, the TBN will append the MN's new CoA with each packet and direct them to the FBN, which may occur in a FIFO (First In, First Out) manner.

The TBN can drain the buffer packets in the event the service is not delivered successfully to the MN. By clearing its memory of the unneeded buffer packets as soon as the TBN determines that a delivery is not possible, the TBN maximizes available memory for other packet deliveries to other MNs.

The TBN also stores the received packets according to the application. For example, if a time-sensitive application is involved, the TBN will prioritize accordingly, moving the application ahead of other applications that are not as time-sensitive. For example, three categories may be used, named "high priority packets", "medium priority packets", and "low priority packets". These packets would be handled by the TBN according to a predetermined policy or protocol. In the case of high priority packets, these would be the most time sensitive packets and would be delivered with the highest priority. Medium priority packets may be those with a number of allowable extensions and an allocated time for each extension is restricted (e.g., a one-time BLT restriction). Low priority packets are those that may tolerate delivery delays. In the event that buffer capacity is exhausted, these packets may be located or relocated first to another CBN. This combination or any other combination of these can be used to handle packet deliveries of different categories.

The TBN also directly assists the CBN in performing its management functions, such as providing the CBN with information about available capacity, used capacity, and predicted demand, as well as a service delivery report. The CBN will use this information provided by the TBN for load balancing and efficient buffering information.

Further, the TBN also informs the assisting CBN with information relative to its management functions, such as proving the CBN with information pertaining to available capacity, used capacity, and predicted demand. The CBN will use this information provided by the TBN for load balancing and efficient buffering information.

Figure 4:
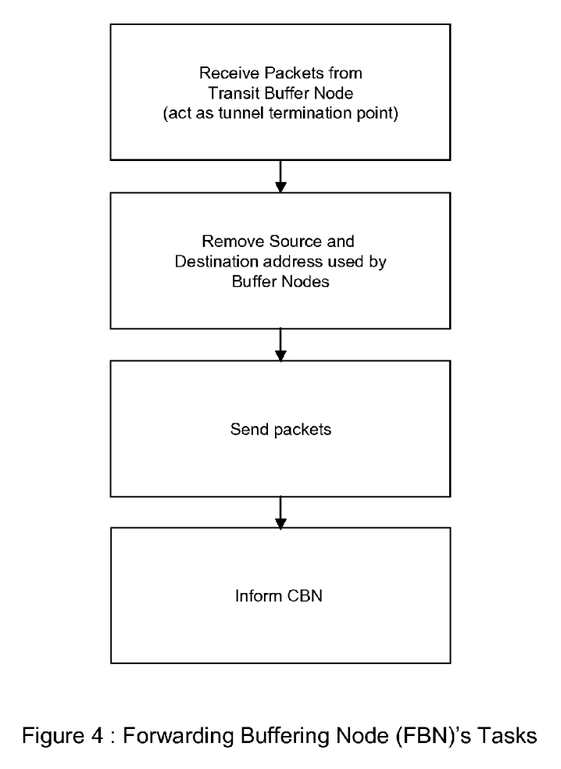
FIG. 4 is a diagram of flushing buffering node (FBN) tasks, in accordance with an embodiment of the present invention.

According to an embodiment of the present invention, the Flushing Buffer Node performs the following functions, which are also illustrated in FIG. 4. The FBN receives packets from the TBN, and acts as a tunnel destination point. Further, it decapsulates the packets it receives and immediately dispatches them to the access point (AP) for transmission to the MN. The FBN also receives packets from peer buffering nodes for delivery only and are intended for receiving packets from external entities, such as a correspondent node, application server, etc. However, the FBN can be configured to reflect a desired policy or fulfill a need within the network if necessary.

In another embodiment of the present invention, the CBN, upon receiving the destination address of the AP, (for which the MN requested pre-authentication and intends to move to), can issue a release buffer trigger message to the TBN to commence tunneling packets to the specific FBN. Thus, the TBN will reserve a provisional CoA, and the FBN will replace the provisional CoA with the original CoA communicated later by the TBN to the FBN. This process will greatly reduce the packet delivery time (also called "jitter") but also enable the FBN to utilize its storage capacity more efficiently. To further enhance security, IP addresses assigned to the CBN, TBN and FBN can either be statically or dynamically assigned. These addresses can be private and not visible externally.

According to another embodiment of the present invention, an ARIMA process is used as a method for predicting buffer resource demand. An ARIMA process is a type of Weiner process wherein the future value of a stochastic variable depends only on its present value. The ARIMA process includes an autocorrelation component, wherein the future value of a stochastic variable is based on its correlation to past values, and a moving average component that filters error measurements in past variable observations. By applying an ARIMA process, the TBN locally predicts the amount of buffering resources R(t) it requires as a reserve for buffering the packets for mobile nodes (MN).

The ARIMA process has several advantages which are beneficial for the present invention. One such advantage is in predicting the MN's buffering resource demand R(t) that allows CBNs to perform local prediction, without requiring communication with other CBNs. ARIMA processes rely on the principal that the future value of R(t) depends only on present and past values of R(t) irrespective of other variables. This improves efficiency and reliability and reduces cost and complexity by reducing unnecessary communications and accurately predicting buffer resource demand.

Another advantage of the ARIMA process is in predicting buffering resource demand R(t) that allows CBNs to determine the instantaneous buffering resource demand, rather than the average network resource demand, thereby providing a more precise and accurate prediction of future buffering resource demand.

Yet another advantage of the ARIMA process is that the prediction model uses two basic steps common to all stochastic prediction methods. The first step involves performing an identification and estimation phase wherein the necessary autoregressive and moving average variables "p" and "q", respectively, are identified and the actual autoregressive and moving average parameters for the ARIMA (p, 1, q) are estimated. The second step involves performing the forecasting phase, wherein the ARIMA (p, 1, q) model constructed in the identification and estimation phase is used to predict future buffering resource demand R(t) based on past observations of buffering resource demand.

As a result, the ARIMA (p, 1, q) model predicts the buffering resource demand and then the using the model to predict future demand, each CBN accurately, precisely, and efficiently predicts and reserves a sufficient amount of buffering resources.

As an example of the need for an accurate prediction process, to avoid packet loss during handoff of duration "t", it is necessary for the TBN to be able to buffer up to the value of "rt", where "r" is the transmission rate of the medium, and "t" represents the duration of the handoff. Therefore, for a transmission rate of 11 Mbps, and a handoff requiring 4 seconds, 44 Mb of buffer is required. As the transmission rate and handoff duration increases, the required buffer size also increases. Even in cases of a "fast handoff", substantial buffering is required, which necessitates an accurate prediction process.

MN before Association to New AP

Referring now to FIG. 1, in Step 1, a mobile node (MN) is shown finding a new access point (AP) by receiving a beacon. A typical beacon frame carries the following information: supported rates of data flow (e.g., 11 Mbps for 802.11b, etc.); a service set identifier (SSID—belonging to a specific wireless LAN); capability information (requirements of stations that wish to belong to the LAN); beacon interval (time between transmissions); a timestamp (enabling synchronization among stations associated with an AP); parameter sets (e.g., information about specific signaling methods, etc.); and/or a traffic indication map (TIM).

In Step 2, shown in FIG. 1, a mobile node (MN), according to the 802.1x standard, sends an EAPOL-Start (Extensible Authentication Protocol) message to the AP with which it is currently associated. This message is initiated by a MN that intends to move from jurisdiction of one AP to the jurisdiction of another AP and desires pre-authentication with the prospective AP. The EAPOL-Start message specifies its own address as well as the MAC (Media Access Control) address of the prospective AP contained in the beacon frame as the destination MAC address. In the present example, the MN initiates the EAPOL-Start message through its present AP (AP1 of Subnet-A in this example) to pre-authenticate itself with the prospective AP (AP1 of Subnet-B in this example) before actually associating with the prospective AP. The current AP forwards an EAPOL-Start frame to the new AP through, e.g., a backend wired LAN.

Further, a copy of the EAPOL-Start message is also forwarded to the CBN by MLME (MAC Layer Management Entity) in the AP. This message notifies the CBN that the MN is mobile and intends to continue the session, which also tells the CBN to initiate buffering service. The CBN then extracts the source AP information (AP1 of Subnet-A in this example), destination AP (AP1 of Subnet-B in this example), and the MN's addresses from the EAPOL-Start message, saves them in its database, and instructs the TBN (via the "start buffer" trigger) to intercept the packets destined for the specified MN and start saving them in memory. The TBN will continue saving packets until it receives the second instruction (via a "release buffer" trigger) from the CBN for flushing packets.

The sending of the EAPOL-Start message to the CBN should not be interpreted as a security risk, as it is the initial message sent to the AP to discover the MAC address of the authenticator. According an embodiment of the present invention, the AP authorizes the CBN for service provisionally after confirming the MN's credentials. The MN's credentials can be upgraded or modified according to the user's desire for a different quality of service.

In Step 3 of FIG. 1, the movement of the MN from Subnet-A to Subnet-B is shown. More specifically, the movement of the MN from the radio coverage of AP1 of Subnet-A to AP1 of Subnet-B.

In Step 4 of FIG. 1, the association of the MN with the AP is shown, using cipher keys as detailed in Step 2 above. In the example shown in FIG. 1, 802.11i cipher keys are also established between the new AP and the MN resulting from pre-authentication, unless 802.11f or IAPP (Inter-Access Point Protocol) is used between the new AP and the old AP. AP2 must contact the authentication or AAA server to authenticate the mobile station identically as was done during the initial authentication through the previous AP. As IEEE 802.1x is designed to operate within a LAN, the applicability of IEEE 802.1x pre-authentication is limited to intra-subnet handoff;

however, if the mobile station is configured to be mobile, e.g., among multiple WLANs, the extended concepts of pre-authentication can be used.

MN after Association to New AP

Once the MN is associated with the new AP, a notification is sent to the previous router AP (which had sent packets to the MN over the previous channel) informing it of the MN's new mobility binding. This mobility binding or "binding update" is allows for the MN to embark on Route Optimization as defined in the IETF MobileIPv6 standard. The main objectives of Route Optimization are: (1) to allow datagrams transmitted to the MN's previous router to be forwarded to its new CoA; (2) to allow any datagrams tunneled to the MN's previous router, from corresponding nodes with out-of-date binding cache entries for the MN, which are forwarded to the new CoA; and (3) to allow any resources consumed by the MN when linked to the previous router (such as radio channel reservations, buffer reservation, etc.), to be released immediately, instead of waiting for its registration lifetime to expire in due course. The binding update then immediately associates the MN's previous CoA with the MN's new CoA, and is authenticated using the IPv6 authentication header while maintaining the previous security level.

Further, the binding update will also be communicated to the CBN, which after receiving it, will extract the MN's new destination address, find the address of the FBN in its own database, and include this address in the release buffer trigger to the TBN for the flushing of packets to the FBN. The MN's new destination address is also duly mapped in the CBN's database. The TBN will respond to the CBN's actions by forwarding all packets to the FBN. The FBN will then decapsulate the packets sent by the TBN dispatch them to the new AP that will transmit them to the newly-arrived MN.

In one embodiment of the present invention, the binding update is required to be extended to the CBN. One way this can be accomplished is to offer buffering service to users for a subscription fee, using better Quality of Service (QoS) as a benefit. This subscription could be free, a flat rate, or other means of measurement, depending on the service provider's policies. In one example of a subscription-based service, the subscriber's credentials can be upgraded/modified to indicate that the subscriber desires better QoS (with minimal or no packet loss) when mobile. If so, then the binding update package will be slightly modified, using any of the reserved bits that are used to notify the CBN of the extension. Also, if the MN and BN are in the same IP subnet, the TBN can send the buffered packets locally to the MN using Address Resolution Protocol (ARP).

The present invention offers many advantages over the known wireless networks, including the following. Transparent buffering service: the MN is not required to solicit for service and waste time and energy in service parameters negotiating. A low signaling burden on the network: as the service is established without setting up a pre-service dialogue, thereby reducing the volume of signaling traffic on the network. Mobile node battery life extension: since the mobile node does not have to discover, solicit, negotiate, or conduct initial computation, the MN's battery life is extended that would otherwise be shortened. Immediate buffering initialization: the network service is offered, without advertising, seeks candidates, evaluates demand, determines the MN's demand against network limitations, and quickly offers service on the network. Efficient packet loss prevention: the complete architecture is managed, with transit and flushing buffer nodes, using prediction methods, to offer efficient service to the MN. Improved resource and network utilization: overall architecture design provides superior network resource utilization. Buffering nodes that communicate with each other internally, improving network security.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A wireless communications network with a managed buffer nodes architecture for buffering data packets during handover of a mobile node from a first wireless access point in a first subnet to a second a wireless access point in a second subnet, comprising:

at least one controlling buffer node;

at least one transition buffer node, including a transition buffer node in the first subnet; and at least one flushing buffer node, including a flushing buffer node in the second subnet;

said controlling buffer node being configured to receive a handover start message from said first wireless access point indicating that the mobile node intends to move to the second subnet;

said controlling buffer node being configured to extract the addresses of the mobile node, said first wireless access point and said second wireless access point and to transmit a save instruction message to said transition buffer node in the first subnet to intercept and save packets destined for that mobile node;

after the mobile node is associated with the second wireless access point and receives the mobile node's new destination address, the controlling buffer node being configured to transmit the mobile node's new destination address to said transition buffer node in the first subnet along with an address of said flushing buffer node in the second subnet for said transition buffer node in the first subnet to forward the saved packets to said flushing buffer node in the second subnet which decapsulates the packets for the second wireless access point that transmits the packets to the mobile node in the second subnet;

wherein said managed buffer node architecture is configured to provide transparent buffering service for a mobile node during handoff from the first wireless access point in the first subnet to the second wireless access point in the second subnet without the mobile node soliciting for the buffering service nor negotiating any buffering service parameters.

2. The network of claim 1, wherein said controlling buffer node, said transition buffer node and said flushing buffer node communicate internally within the network with each other increasing said network's security.

3. The network of claim 1, further comprising at least one access point which is configured to communicate with other access points.

4. The network of claim 1, wherein said controlling buffer node further comprises a controlling authority performing multiple functions and wherein said controlling buffer node is configured to receive authorization from first wireless access point for buffering service after said first wireless access point confirms the mobile node's credentials.

5. The network of claim 1, wherein said flushing buffer node is configured to perform multiple functions comprising receiving packets from the transition buffer node, acting as a tunnel destination point, decapsulating said data packets it receives and immediately dispatches said data packets to said access point (AP) for transmission to said mobile node, and receiving said data packets from said buffer nodes.

6. The network of claim 1, wherein said controlling buffer node issues a release buffer command after receiving the destination address of said access point.

7. The network of claim 1, wherein said controlling buffer node, transition buffer node and flushing buffer node are assigned internet protocol addresses either statically or dynamically, and said addresses are also private and not visible outside said network.

8. The network of claim 1, wherein an autoregressive integrated moving average model predicts a buffering resource demand, which said network uses to predict future said buffering resource demand.

9. The network of claim 1, wherein said nodes wirelessly communicate with each other within said network preventing nodes outside of said network from communicating with said nodes.

10. The network of claim 1, further comprising said controlling buffer node receiving a start message, directing said transit buffer node to start buffering, receiving a binding update, and directing said transit buffer node to flush data to said flushing buffer node.

11. The network of claim 1, further comprising said transit buffer node receiving a trigger from said controlling buffer node, creating a directory for said mobile node, setting a timer for buffer lease time, intercepting and retaining data for said mobile node, receiving the address of said flushing buffer node, forwarding the data for the mobile node to the serving flushing buffer node, emptying said transit buffer node's memory, and reporting to said controlling buffer node.

12. The network of claim 1, wherein said flushing buffer node is configured to perform receiving data from the transit buffer node, acting as a tunnel destination point, decapsulating said data it receives and dispatching them to the access point for transmission to the mobile node, and receiving data from other nodes.

13. The network of claim 1, wherein said transition buffer node is configured to allocate a buffer release time for which the transition buffer node will offer buffering services, said buffer release time being determined by the transition buffer node based on factors including at least one of application type, available resources, demand prediction and network data rate.

14. The network of claim 1, wherein said transition buffer node is configured to locally predict the mobile node's resource demand.

15. A wireless communications network with a managed buffer nodes architecture, said managed buffer node architecture comprising:
a controlling buffer node;
a plurality of transition buffer nodes, including a transition buffer node in a first subnet which is managed by said controlling buffer node; and
a plurality of flushing buffer nodes, including a flushing buffer node in a second subnet which is also managed by said controlling buffer node;
wherein said controlling buffer node performs managerial functions over said plurality of transition buffer nodes and said plurality of flushing buffer nodes across subnets, said transition buffer nodes retains data packets in transit, and said flushing buffer nodes facilitate the delivery of said data packets;
wherein said managed buffer node architecture is configured to provide transparent buffering service for a mobile node during handoff from a wireless access point in said first subnet to a wireless access point in the second subnet without the mobile node soliciting for the buffering service nor negotiating any buffering service parameters.

16. A wireless communications network, comprising:
a controlling buffer node which performs managerial functions related to buffer of packets for a mobile node during handover from a first wireless access point in a first subnet to a second wireless access point in a second subnet;
a transition buffer node located within a first subnet which holds data packets in transit based on instructions from said controlling buffer node;
a flushing buffer node located within a second subnet which facilitates the delivery of data packets received from said transition buffer node;
wherein said network provides a comprehensive buffering service to prevent said data packet losses during handoffs and wherein said nodes communicate with each other wirelessly and internally;
said managed buffer node architecture being configured to provide transparent buffering service for the mobile node during handoff from said first wireless access point in said first subnet to said second wireless access point in the second subnet without the mobile node soliciting for the buffering service nor negotiating any buffering service parameters.

17. The network of claim 16, further comprising at least one access point, which is capable of communicating with at least one other access point.

18. The network of claim 16, wherein said controlling buffer node is a controlling authority.

19. The network of claim 16, wherein said controlling buffer node issues a release buffer command after receiving the destination address of the access point.

20. The network of claim 16, wherein said controlling buffer node, transition buffer node and flushing buffer node are assigned internet protocol addresses either statically or dynamically, said address are also private and not visible outside said network.

21. The network of claim 16, wherein an autoregressive integrated moving average model predicts the buffering resource demand, which said network uses to predict future said buffering resource demand.

22. The network of claim 16, wherein said controlling buffer node is configured to receive a binding update after the mobile node is associated with the second wireless access point and the mobile node acquires a new mobility binding.

23. The network of claim 16, wherein after the mobile node is associated with the second wireless access point the controlling buffer node receives the mobile node's new destination address and transmits the mobile node's new destination address to the transition buffer node in the first subnet along with an address of a flushing buffer node in the second subnet so that the transition buffer node can forward all packets to the flushing buffer node to be decapsulated to the second wireless access point that will transmit them to the mobile node that has newly arrived to the second access network.

24. The network of claim 16, wherein said transition buffer node is configured to allocate a buffer release time for which the transition buffer node will offer buffering services, said buffer release time being determined by the transition buffer node based on factors including at least one of application type, available resources, demand prediction and network data rate.

* * * * *

UNITED STATES PATENT AND TRADEMARK OFFICE
CERTIFICATE OF CORRECTION

Page 1 of 1

PATENT NO. : 7,826,424 B2
APPLICATION NO. : 11/456807
DATED : November 2, 2010
INVENTOR(S) : Yaqub It is certified that error appears in the above-identified patent and that said Letters Patent is hereby corrected as shown below:

On the Title Page

Item (73), under "Assignees", in Column 1, Lines 1-3,
delete "Toshiba America Research, Inc., Piscataway;
Telcordia Technologies, Inc., Piscataway" and
insert -- Toshiba America Research, Inc., Piscataway, NJ (US);
Telcordia Technologies, Inc., Piscataway, NJ (US) --, therefor.

Item (56), under "OTHER PUBLICATIONS", in Column 2, Line 5, delete "IVPv6"," and
insert -- IPv6", --, therefor.

In the Specification

In Column 1, Line 45, delete "1Uv6" and insert -- IUv6 --, therefor.

In the Claims

In Column 10, Line 46, in Claim 1, delete "second a wireless" and insert -- second wireless --, therefor.

Signed and Sealed this
Sixth Day of January, 2015

Michelle K. Lee
*Deputy Director of the United States Patent and Trademark Office*